April 21, 1970  E. W. REINER  3,507,271
SPIROMETER
Filed Aug. 28, 1967

INVENTOR.
EDWIN W. REINER
BY
ATTORNEYS

United States Patent Office 3,507,271
Patented Apr. 21, 1970

3,507,271
SPIROMETER
Edwin W. Reiner, 3404 Valley Road,
Bonita, Calif. 92002
Filed Aug. 28, 1967, Ser. No. 663,776
Int. Cl. A61b 5/08
U.S. Cl. 128—2.08     1 Claim

ABSTRACT OF THE DISCLOSURE

The method of and apparatus for determining the respiration value of an individual, utilizing a balloon type inflatable vessel into which the individual exhales, the vessel havng spaced marks thereon, which marks increase in distance from one another upon inflation, and utilizing a flexible scale having indicia thereon by applying the scale over the marks to determine the value of inflation.

---

In practicing the present invention, the patient first inhales air to the patient's full capacity. Thereafter, the patient exhales into a balloon type inflatable vessel for a predetermined length of time, usually three seconds. This balloon is provided with two spaced marks which increase in distance from one another upon inflation and expansion of the balloon.

The vessel is then closed, and while closed, a flexible scale, having numerical indicia thereon, is applied over the spaced marks.

The vessel and scale are herein, at times, referred to as "spirometer apparatus."

Other features and the advantages of the present invention will be apparent from the following description, reference being had to the accompanying drawing wherein a preferred embodiment of the invention is illustrated.

Figure 1:
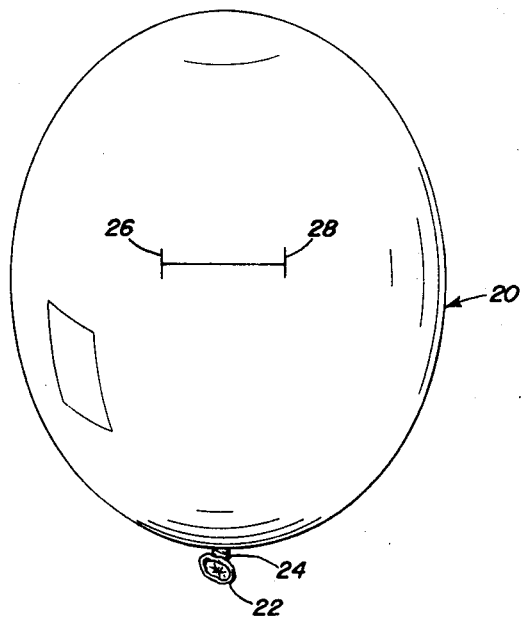
FIG. 1 is a side view of the balloon type, inflatable-expansible vessel.
Figure 2:
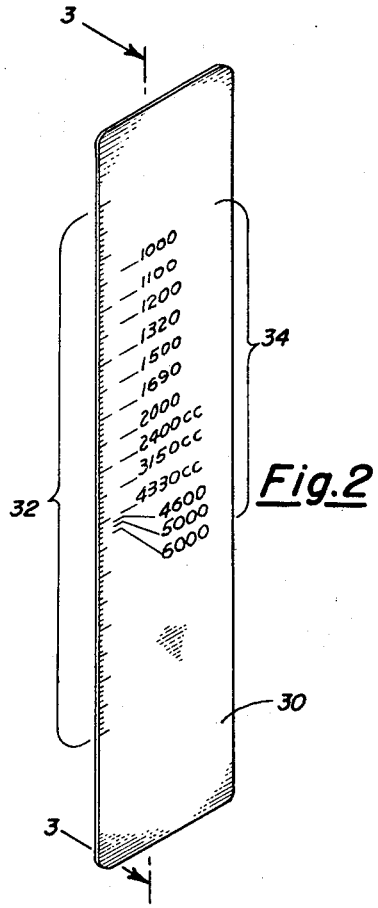
FIG. 2 is a perspective view of the scale.
Figure 3:
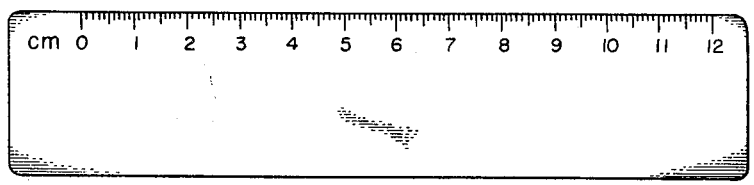
FIG. 3 is a rear view of the scale.

Referring more in detail to the drawing, the spirometer includes the balloon 20 having a mouth-piece 22 leading to the usual inlet opening (not shown). After inflation, the mouth-piece can be closed in any suitable manner, as for example, by putting a twist therein as shown at 24.

The balloon is provided with two marks 26 and 28, which increase in distance from one another commensurate with the expansion of the balloon while being inflated.

The spirometer includes also a scale 30 having parallel line indicia 32 and numerals 34 opposite the lines, indicating, for example, cubical capacity. This scale is flexible, that is, it can be bent to complement the curvature of the balloon.

As previously stated, in testing and determining the respiration value of the patient, after inhaling, the patient exhales into the mouthpiece of the balloon, for example, for three seconds. This function causes increase in distance between marks 26 and 28. The balloon is then sealed closed. Thereafter, the bendable scale is applied over the expanded marks 26 and 28. In this manner, the technician can determine the degree of respiration in cubic centimeters.

The "CM" indicia on the back of the scale may be used for other purposes by the technician.

From the foregoing, it is apparent that by virtue of the present invention, I have provided an extremely simple and inexpensive spirometer, which is easy to use, and, when used properly, is accurate. The balloons, being inexpensive, can be discarded after one use, thus materially increasing sanitation.

While the form of embodiment herein shown and described, constitutes a preferred form, it is to be understood that other forms may be adopted.

I claim:

1. Spirometer apparatus, comprising in combination:
   (A) an inflatable-expansible vessel having:
      (1) spaced marks thereon, which increase in distance from one another commensurate with the expansible vessel during inflation of the vessel;
      (2) an air inlet opening formed in the vessel;
   (B) a flexible scale capable of flexing to complement the shape of the inflated vessel and having:
      (1) a scale having spaced parallel lines thereon;
      (2) and quantity indicia alongside the lines.

References Cited

UNITED STATES PATENTS 225,710   3/1880   Marsh _____ 128—2.08

DELBERT B. LOWE, Primary Examiner